United States Patent
Kim et al.

(10) Patent No.: US 9,363,095 B2
(45) Date of Patent: Jun. 7, 2016

(54) M2M DEVICE AND BASE STATION FOR TRANSMISSION AND RECEPTION OF MULTICAST TRAFFIC AND METHOD FOR TRANSMISSION AND RECEPTION OF MULTICAST TRAFFIC

(75) Inventors: Jeongki Kim, Anyang-si (KR); Giwon Park, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 434 days.

(21) Appl. No.: 13/883,528

(22) PCT Filed: Nov. 28, 2011

(86) PCT No.: PCT/KR2011/009125
§ 371 (c)(1),
(2), (4) Date: May 3, 2013

(87) PCT Pub. No.: WO2012/074257
PCT Pub. Date: Jun. 7, 2012

(65) Prior Publication Data
US 2013/0242848 A1    Sep. 19, 2013

Related U.S. Application Data

(60) Provisional application No. 61/419,718, filed on Dec. 3, 2010, provisional application No. 61/440,348, filed on Feb. 7, 2011.

(30) Foreign Application Priority Data

Nov. 21, 2011    (KR) .......................... 10-2011-0121377

(51) Int. Cl.
| | | |
|---|---|---|
| H04H 20/71 | (2008.01) |
| H04L 12/18 | (2006.01) |
| H04W 52/02 | (2009.01) |
| H04W 4/00 | (2009.01) |
| H04W 4/06 | (2009.01) |

(Continued)

(52) U.S. Cl.
CPC ............. *H04L 12/189* (2013.01); *H04W 4/005* (2013.01); *H04W 4/06* (2013.01); *H04W 52/0219* (2013.01); *H04W 68/00* (2013.01); *H04W 76/002* (2013.01)

(58) Field of Classification Search
CPC .. H04L 12/189; H04W 52/0219; H04W 4/06; H04W 4/005; H04W 76/002; H04W 68/00
See application file for complete search history.

(56) References Cited

U.S. PATENT DOCUMENTS 8,306,546 B2 * 11/2012 Ryu et al. ...................... 455/450
9,014,078 B2 *  4/2015 Kim et al. ..................... 370/312

(Continued)

FOREIGN PATENT DOCUMENTS

| CN | 103120002 | 5/2013 |
| CN | 103155664 | 6/2013 |

(Continued)

OTHER PUBLICATIONS

Catt, "Paging and downlink transmission for MTC," 3GPP TSG RAN WG2 Meeting #70, R2-102781, May 2010, 3 pages.

(Continued)

*Primary Examiner* — Ayaz Skeikh
*Assistant Examiner* — Hai-Chang Hsiung
(74) *Attorney, Agent, or Firm* — Lee, Hong, Degerman, Kang & Walmey; Jonathan Kang; Michael Monaco

(57) ABSTRACT

A method for performing communication of a machine to machine (M2M) device with a base station comprises the steps of receiving a paging message from the base station; and receiving multicast data from the base station on the basis of the paging message, wherein the paging message includes time information indicating the time when the base station transmits the multicast data to the M2M device.

12 Claims, 8 Drawing Sheets

(51) Int. Cl.
*H04W 68/00* (2009.01)
*H04W 76/00* (2009.01)

(56) References Cited

U.S. PATENT DOCUMENTS

| | | | |
|---|---|---|---|
| 2009/0125776 A1* | 5/2009 | Cheon et al. | 714/748 |
| 2010/0248749 A1* | 9/2010 | Koo | H04W 60/00 455/458 |
| 2011/0032860 A1* | 2/2011 | Kojima | 370/312 |
| 2011/0305158 A1* | 12/2011 | Kim et al. | 370/252 |
| 2012/0093052 A1* | 4/2012 | Kang et al. | 370/311 |

FOREIGN PATENT DOCUMENTS

| | | |
|---|---|---|
| JP | 2000-184423 | 6/2000 |
| JP | 2006-019801 | 1/2006 |
| JP | 2013-545360 | 12/2013 |
| KR | 10-2009-0127048 | 12/2009 |
| KR | 10-2009-0129289 | 12/2009 |
| KR | 10-2010-0091091 | 8/2010 |
| WO | 2012/050391 | 4/2012 |

OTHER PUBLICATIONS

PCT International Application No. PCT/KR2011/009125, Notification of Transmittal of the International Search Report and the Written Opinion of the International Searching Authority, or the Declaration dated May 29, 2012, 8 pages.

The State Intellectual Property Office of the People's Republic of China Application Serial No. 201180057919.9, Office Action dated Jul. 3, 2015, 7 pages.

* cited by examiner

M2M DEVICE AND BASE STATION FOR TRANSMISSION AND RECEPTION OF MULTICAST TRAFFIC AND METHOD FOR TRANSMISSION AND RECEPTION OF MULTICAST TRAFFIC

CROSS-REFERENCE TO RELATED APPLICATIONS

This application is the National Stage filing under 35 U.S.C. 371 of International Application No. PCT/KR2011/009125, filed on Nov. 28, 2011, which claims the benefit of earlier filing date and right of priority to Korean Patent Application No. 10-2011-0121377, filed on Nov. 21, 2011, and also claims the benefit of U.S. Provisional Application Ser. No. 61/419,718, filed on Dec. 3, 2010, and U.S. Provisional Application Ser. No. 61/440,348, filed on Feb. 7, 2011, the contents of which are all hereby incorporated by reference herein in their entirety.

TECHNICAL FIELD

The present invention relates to a machine to machine (M2M) device and a base station for performing multicast scheduling and a method for performing multicast scheduling.

BACKGROUND ART

Machine-to-Machine (M2M) refers to communication between an electronic device and another electronic device. In a broad sense, M2M refers to wire or wireless communication between electronic devices or communication between a machine and a device controlled by a person. However, it is general that M2M recently refers to wireless communication between electronic devices, i.e., devices performed without control of a person.

In the early 1990s when M2M communication has been introduced, M2M communication has been recognized as remote control or telematics and M2M communication markets have been very restrictive. However, M2M communication markets have received attention all over the world since M2M communication had been able to grow rapidly for last several years. Particularly, M2M communication has exerted its great influence at point of sales (POS) and security related application markets in the fields of fleet management, remote monitoring of machine and facilities, measurement of working time on construction machine facilities, and smart meter automatically measuring heat or the use of electricity. It is expected that M2M communication will be used for various purpose of uses in association with the existing mobile communication and low power communication solutions such as wireless high-speed Internet, Wi-Fi, and Zigbee and that its coverage will be extended to business to consumer (B2C) markets without limitation to business to business (B2B) markets.

In the M2M communication age, since all machines provided with a subscriber identity module (SIM) card may be able to perform data transmission and reception, they may remotely be controlled. For example, M2M communication technologies may be used for many machines and equipments such as cars, trucks, trains, containers, vending machines, and gas tanks. In this way, application ranges of M2M communication technologies are very broad.

According to the related art, since it was general that a user equipment was controlled separately, communication between a base station and a user equipment has been performed by a one-to-one communication mode. Supposing that many M2M devices perform communication with a base station through such a one-to-one communication mode, network overload will be caused by signaling generated between each of the M2M devices and the base station. As described above, if M2M communication is rapidly spread and widely used, a problem may occur due to overhead caused by communication between M2M devices or between each of the M2M devices and the base station. In this respect, in order to efficiently solve the problem of overhead, it is required that the M2M device should be scheduled considering features of M2M communication.

DISCLOSURE OF INVENTION

Technical Problem

Accordingly, the present invention has been devised substantially obviate one or more problems due to limitations and disadvantages of the related art.

An object of the present invention is to provide a method and apparatus for performing communication of an M2M device with a base station.

Another object of the present invention is to provide a method and apparatus for performing communication of a base station with an M2M device.

Still another object of the present invention is to provide an M2M device that performs communication with a base station.

Further still another object of the present invention is to provide a base station that performs communication with an M2M device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for performing communication of a machine to machine (M2M) device with a base station comprises the steps of receiving a paging message from the base station; and receiving multicast data from the base station on the basis of the paging message, wherein the paging message includes time information indicating the time when the base station transmits the multicast data to the M2M device. The time information may be information indicating a frame number, a subframe number, or a superframe number, where the base station starts transmission of the multicast data. Alternatively, the time information may be a frame offset indicating a waiting time when the M2M device receives the multicast data. The paging message may further include a multicast traffic indicator indicating transmission of the multicast data and an M2M device group identifier indicating M2M group which is a transmission target of the multicast data.

In another aspect of the present invention, a method for performing communication of a base station with a machine to machine (M2M) device comprises the steps of transmitting a paging message to the M2M device; and transmitting multicast data to the M2M device on the basis of the paging message, wherein the paging message includes time information indicating the time when the base station transmits the multicast data to the M2M device. The time information may be information indicating a frame number, a subframe number, or a superframe number, where the base station starts transmission of the multicast data. Alternatively, the time information may be a frame offset indicating a waiting time when the M2M device receives the multicast data. The paging message may further include a multicast traffic indicator indicating transmission of the multicast data and an M2M device group identifier indicating M2M group which is a transmission target of the multicast data.

In still another aspect of the present invention, a machine to machine (M2M) device, which performs communication with a base station, comprises a receiver; and a processor configured to control the receiver, wherein the processor controls the receiver to receive a paging message from the base station and controls the receiver to receive multicast data from the base station on the basis of the paging message, and the paging message includes time information indicating the time when the base station transmits the multicast data to the M2M device. The time information may be information indicating a frame number, a subframe number, or a superframe number, where the base station starts transmission of the multicast data. Alternatively, the time information may be a frame offset indicating a waiting time when the M2M device receives the multicast data. The paging message may further include a multicast traffic indicator indicating transmission of the multicast data and an M2M device group identifier indicating M2M group which is a transmission target of the multicast data.

In further still another aspect of the present invention, a base station, which performs communication with a machine to machine (M2M) device, comprises a transmitter; and a processor configured to control the transmitter, wherein the processor controls the transmitter to transmit a paging message to the M2M device and controls the transmitter to transmit multicast data to the M2M device on the basis of the paging message, and the paging message includes time information indicating the time when the base station transmits the multicast data to the M2M device. The time information may be information indicating a frame number, a subframe number, or a superframe number, where the base station starts transmission of the multicast data. The time information may be a frame offset indicating a waiting time when the M2M device receives the multicast data. The paging message may further include a multicast traffic indicator indicating transmission of the multicast data and an M2M device group identifier indicating M2M group which is a transmission target of the multicast data.

Advantageous Effects of Invention

According to various embodiments of the present invention, if a method for transmitting multicast traffic, as suggested in the present invention, is used, power consumption of the M2M device can be minimized and efficient resource use of the M2M system can be maximized.

Also, since the M2M device can receive downlink multicast data even without ending an idle mode, the M2M system can be managed efficiently.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
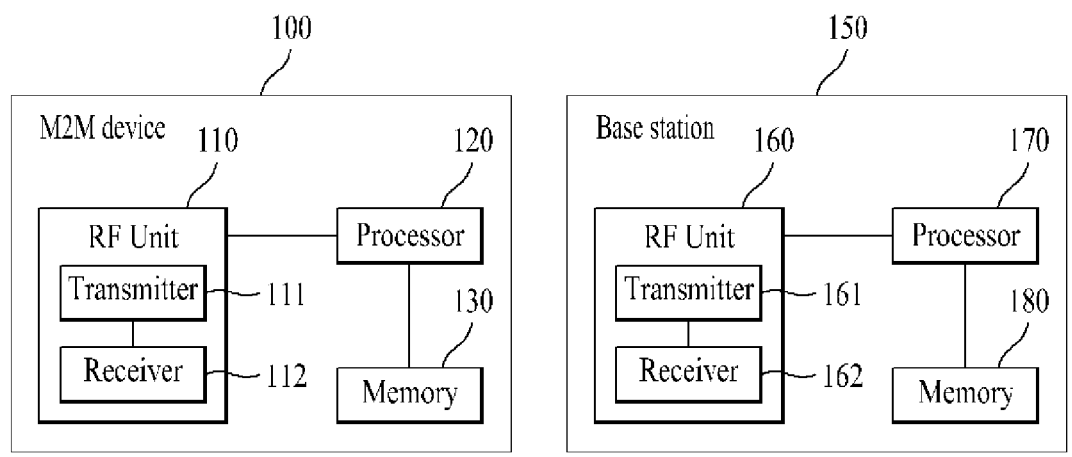
FIG. 1 is a brief diagram illustrating configurations of an M2M device and a base station according to one embodiment of the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the following description, it is assumed that a terminal refers to a mobile or fixed type user terminal such as a user equipment (UE), a mobile station (MS), an advanced mobile station (AMS), and a machine to machine (M2M) device. It is also assumed that a base station refers to a random node of a network terminal, such as Node B, eNode B, an advanced base station (ANB), and an access point (AP), which performs communication with the user equipment. In this specification, although the present invention will be made based on IEEE 802.16e/m, it may be applied to other mobile communication systems such as 3GPP LTE and LTE-A system.

Hereinafter, communication between M2M devices means information exchange performed between user equipments, or between a base station and user equipments without control of a user. Accordingly, the M2M device means a user equipment that can support communication of the M2M device. An access service network for M2M service will be defined as an M2M access service network (ASN), and a network entity that performs communication with M2M devices will be referred to as M2M server. The M2M server performs M2M application, and provides M2M specific service for one or more M2M devices. M2M feature is a feature of M2M application, and one or more features may be required to provide application. M2M device group means a group of M2M devices that share one or more features.

Devices (that may be referred to as various terms such as M2M device and M2M communication device) that perform communication in M2M mode will be increased gradually in a certain network as their device application types are increased. Examples of device application types, which are discussed, include, but not limited to, (1) security, (2) public safety, (3) tracking and tracing, (4) payment, (5) healthcare, (6) remote maintenance and control, (7) metering, (8) consumer device, (9) fleet management at POS (Point Of Sales) and security related application market, (10) communication between devices of vending machine, (11) remote controlling of machine and facilities, measurement of working time on construction machine facilities, and smart meter automatically measuring heat or the use of electricity, and (12) surveillance video communication of a surveillance camera. Other various device application types are being discussed.

Another feature of the M2M device is low mobility or no mobility. Low mobility or no mobility means that the M2M device is stationary for a long time. The M2M communication system may simplify or optimize mobility-associated operations for a specific M2M application having a fixed location such as secured access and surveillance, public safety, payment, remote maintenance and control, and metering.

As described above, as the device application types are increased, the number of M2M communication devices may be increased more rapidly than the number of general mobile communication devices. Accordingly, if the communication devices respectively perform communication with a base station, serious load may be caused in a wireless interface and network.

Hereinafter, the embodiment of the present invention will be described based on M2M communication applied to IEEE 802.16e/m. However, the present invention is not limited to the IEEE 802.16e/m, and the embodiment of the present invention may be applied to other systems such as 3GPP LTE system in the same manner as the IEEE 802.16e/m.

FIG. 1 is a brief diagram illustrating configurations of an M2M device and a base station according to one embodiment of the present invention.

In FIG. 1, each of an M2M device 100 (or may be referred to as M2M communication device but hereinafter referred to as M2M device) and a base station 150 may include a radio frequency (RF) unit 110, 160, a processor 120, 170. Each of the M2M device and the base station may selectively include a memory 130, 180. Each RF unit 110, 160 may include a transmitter 111, 161 and a receiver 112, 162. In case of the M2M device 100, the transmitter 111 and the receiver 112 may be configured to transmit and receive a signal to and from the base station 150 and other M2M devices, and the processor 120 may be functionally connected with the transmitter 111 and the receiver 112 to control the signal transmission and reception procedure of the transmitter 111 and the receiver 112 to and from other devices. Also, the processor 120 performs various kinds of processing for a signal for transmission and then transmits the processed signal to the transmitter 111, and may perform processing for the signal received by the receiver 112. The processor 120 may store information included in the exchanged message in the memory 130 if necessary. The M2M device 100 configured as above may perform methods of various embodiments which will be described later. In the mean time, although not shown in FIG. 1, the M2M device 100 may include various additional elements in accordance with its device application type. If the corresponding M2M device 100 is for smart metering, it may include additional element for power measurement. An operation for power measurement may be controlled by the processor 120 shown in FIG. 1, or may be controlled by a separate processor (not shown).

Although FIG. 1 illustrates an example of communication performed between the M2M device 100 and the base station 150, a method for M2M communication according to the present invention may be performed between the M2M devices, each of which may perform the method according to various embodiments, which will be described later, in the same manner as each device shown in FIG. 1.

In case of the base station 150, the transmitter 161 and the receiver 162 may be configured to transmit and receive a signal to and from another base station, M2M server and M2M devices, and the processor 170 may be functionally connected with the transmitter 161 and the receiver 162 to control the signal transmission and reception procedure of the transmitter 161 and the receiver 162 to and from other devices. Also, the processor 170 performs various kinds of processing for a signal for transmission and then transmits the processed signal to the transmitter 161, and may perform processing for the signal received by the receiver 162. The processor 170 may store information included in the exchanged message in the memory 180 if necessary. The base station 150 configured as above may perform methods of various embodiments which will be described later.

Each processor 120, 170 of the M2M device 110 and the base station 150 indicates (for example, controls, coordinates or manages) the operation of each of the M2M device 110 and the base station 150. Each processor 120, 170 may be connected with the memory 130, 180 that stores program codes and data therein. The memory 130, 180 is connected with the processor 120, 170 and stores an operating system, an application, and general files therein.

The processor 120, 170 may be referred to as a controller, a microcontroller, a micro-processor, or a microcomputer. In the mean time, the processor 120, 170 may be implemented by hardware, firmware, software, or their combination. If the embodiments of the present invention are implemented by hardware, the processor 120, 170 may include application specific integrated circuits (ASICs), digital signal processors (DSPs), digital signal processing devices (DSPDs), programmable logic devices (PLDs), and field programmable gate arrays (FPGAs).

In the mean time, if the embodiments of the present invention are implemented by firmware or software, the firmware or software may be configured to include a module, a procedure, or a function, which performs functions or operations of the present invention. The firmware or software may be provided in the processor 120, 170 or may be stored in the memory 130, 180 and then may be driven by the processor 120, 170.

Hereinafter, an idle mode means a mode that manages a paging group, a paging cycle and a paging offset approved by the base station, through signaling between the user equipment and the base station to save the power of the user equipment. In other words, the idle mode is a mechanism that even though the user equipment roams a radio link environment where a plurality of base stations are located over a broad area, it may receive a downlink broadcast message periodically without registration with a specific base station.

The idle mode is downlink synchronized to receive a paging message, which is a broadcast message for a certain interval only, by stopping all normal operations as well as handover (HO). The paging message is to indicate a paging action for the user equipment. For example, examples of the paging action include ranging and network reentry.

The idle mode may be initiated by the user equipment or the base station. In other words, the user equipment may enter the idle mode by transmitting a deregistration request (DREG-REQ) message to the base station and receiving a deregistration response (DREG-RSP) message from the base station in response to the deregistration request (DREG-REQ) message. Also, the base station may enter the idle mode by transmitting an unsolicited deregistration response (DREG-RSP) message or a deregistration command (DREG-CMD) message.

If the user equipment receives its paging message for an available interval (AI), it transmits and receives data to and from the base station by switching a current mode to a connected mode through a network entry procedure.

Idle state or idle mode action means that the user equipment is supported to periodically perform downlink broadcast traffic transmission even though it is not registered with a specific base station when it moves to a radio link environment of multiple base stations. If the user equipment does not receive traffic from the base station for a certain time, it may be shifted to the idle state for power saving. The user equipment which has been shifted to the idle mode may determine whether to shift to a normal mode or remain at the idle state by receiving a broadcast message (for example, paging message) broadcasted from the base station for an available interval (AI).

The user equipment may be benefited from the idle state in such a manner that activity requirements related to handover and normal management requirements are removed. The idle state may save the power and management resources used by the user equipment by restricting activity of the user equipment to be scanned for a discrete cycle. Also, the network and the base station may be benefited from the idle state in such a manner that a simple and proper mode of pending downlink traffic is provided to the user equipment and radio interface and network handover (HO) traffic is removed from the user equipment which is inactive.

Paging means a function for identifying a location (for example, any base station or any exchange station) of a corresponding user equipment when a call signal is generated. A plurality of base stations that support the idle state or idle mode may belong to a specific paging group to configure a paging region. At this time, a paging group represents a logical group. The paging group is intended to provide a downlink with a neighboring zone that can be paged, if there is any traffic decided to target the user equipment. Preferably, the paging group fulfils a condition that a specific user equipment should be great enough to exist for most of time within the same paging group and should be small enough to maintain a proper level of paging load.

The paging group may include one or more base stations. Also, one base station may be included in one or more paging groups. The paging group is defined by a management system. The paging group may use a paging group-action backbone network message. Also, a paging controller may manage a list of user equipments, which are in an idle state, by using a paging announcement message which is one of backbone network messages, and may manage initial paging of all base stations that belong to the paging group.

For convenience of description, paging at the idle mode will be described based on the IEEE 802.16 system. However, technical spirits of the present invention are not limited to the IEEE 802.16 system. The user equipment transmits a deregistration request (DREG-REQ) message to the base station to enter the idle mode and request deregistration with the base station. Afterwards, the base station transmits a deregistration response (DREG-RSP) message to the user equipment in response to the deregistration request (DREG-REQ) message. At this time, the deregistration response (DREG-RSP) message includes paging information. In this case, entry of the user equipment to the idle mode may be initiated in accordance with a request of the base station. Accordingly, the base station transmits the deregistration response (DREG-RSP) message to the user equipment.

The paging information may include parameters such as paging cycle, paging offset, paging group identifier (PGID), and paging listening interval.

The user equipment that has received the deregistration response (DREG-RSP) message enters the idle mode by referring to the paging information. The idle mode has a paging cycle that may include an available interval and an unavailable interval. At this time, the available interval is the same as the paging listening interval or the paging interval. The paging offset means the time (for example, frame or subframe) when the paging interval starts within the paging cycle. Also, the paging group identifier represents an identifier of a paging group allocated to the user equipment. Also, the paging information may include paging message offset information. In this case, the paging message offset information represents the time when the paging message is transmitted from the base station. Afterwards, the user equipment may receive a paging message for the available interval, i.e., paging listening interval by using the paging information. In this case, the paging message may be transmitted through the base station or a paging controller. In other words, the user equipment monitors a radio channel in accordance with the paging cycle to receive the paging message.

The user equipment in the idle mode identifies whether downlink (DL) data are transferred thereto by receiving the paging message for the paging listening interval. If there are downlink data (i.e., positive indication), the user equipment performs a network reentry procedure including a ranging procedure. Afterwards, the user equipment performs a connection setup procedure of a downlink service flow through a dynamic service addition (DSA) procedure. After the connection of the service flow is set up, the base station transmits downlink data of the corresponding service to the user equipment.

Figure 2:
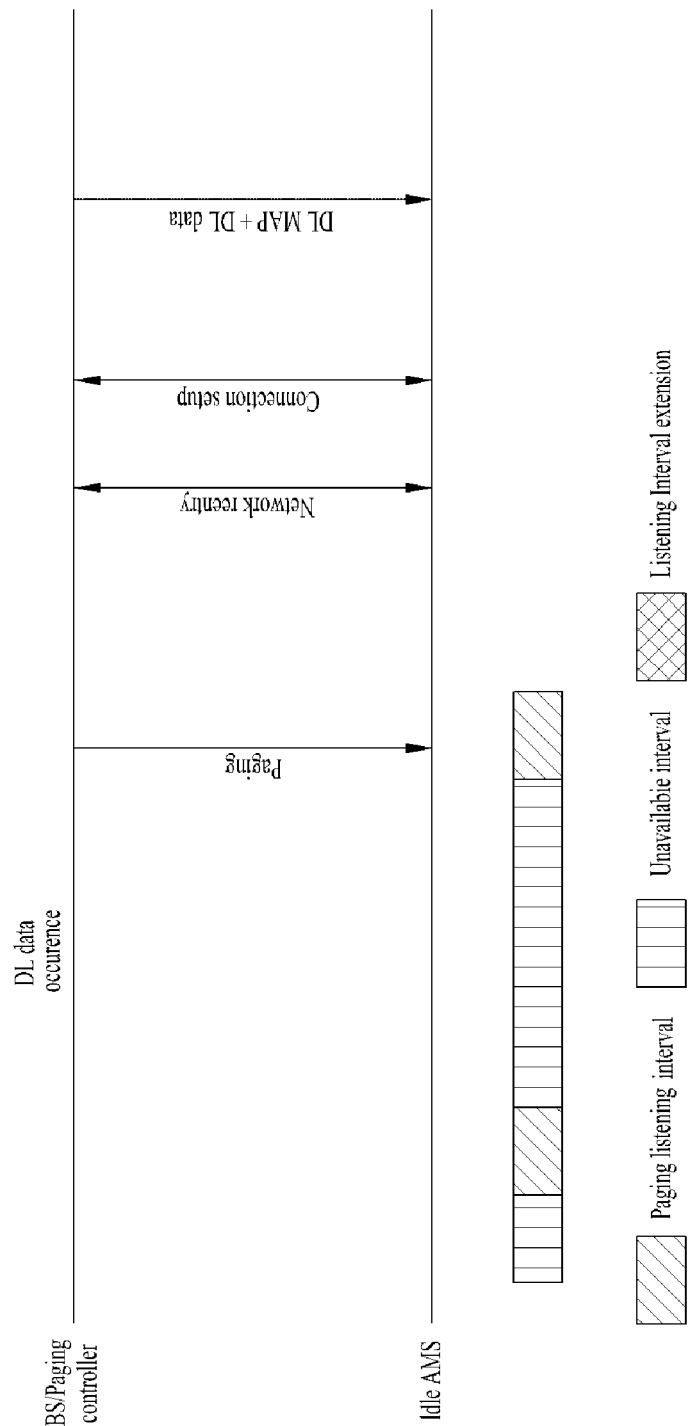
FIG. 2 is a diagram illustrating multicast data transmission between a user equipment and a base station.

FIG. 2 is a diagram illustrating an example of downlink data transmission between a user equipment and a base station. Referring to FIG. 2, in order to receive downlink (DL) traffic in the existing system, the user equipment in the idle mode performs network reentry after receiving the paging message.

The user equipment in the idle mode identifies whether there are downlink (DL) data transferred thereto, by receiving the paging message for its paging listening interval. If there are downlink (DL) data (i.e., positive indication), the user equipment performs a network reentry procedure including a ranging procedure. Afterwards, the user equipment performs a connection setup procedure of a downlink (DL) service flow through a dynamic service addition (DSA) procedure. After the connection of the service flow is set up, the base station transmits downlink data of the corresponding service to the user equipment.

In M2M scenario, since most of M2M devices are not devices which a user carries them unlike the existing user equipment such as a cellular phone, an automatic application or firmware update procedure for the M2M devices may be main application in M2M service scenario. For example, in order to update firmware of each device, the M2M server may transmit updated information to M2M devices having the corresponding application. In order to transmit multicast data, which are required to be transmitted to several user equipments in common, to the M2M devices of the idle mode, the base station according to the embodiment of FIG. 2 may page the corresponding M2M devices. The paged user equipments start to transmit a random access code and access the network by performing a network reentry procedure, and receive downlink (DL) traffic from the base station. In this case, problems occur in that the above procedures may increase unnecessary use of resources in the network, and also increase power consumption of the user equipment.

In order to solve the aforementioned problems, according to M2M communication of the present invention, when multicast data generated by an event triggered mode are transmitted to the user equipment of the idle mode, M2M device of an idle mode may receive multicast data efficiently by using a paging method.

Figure 3:
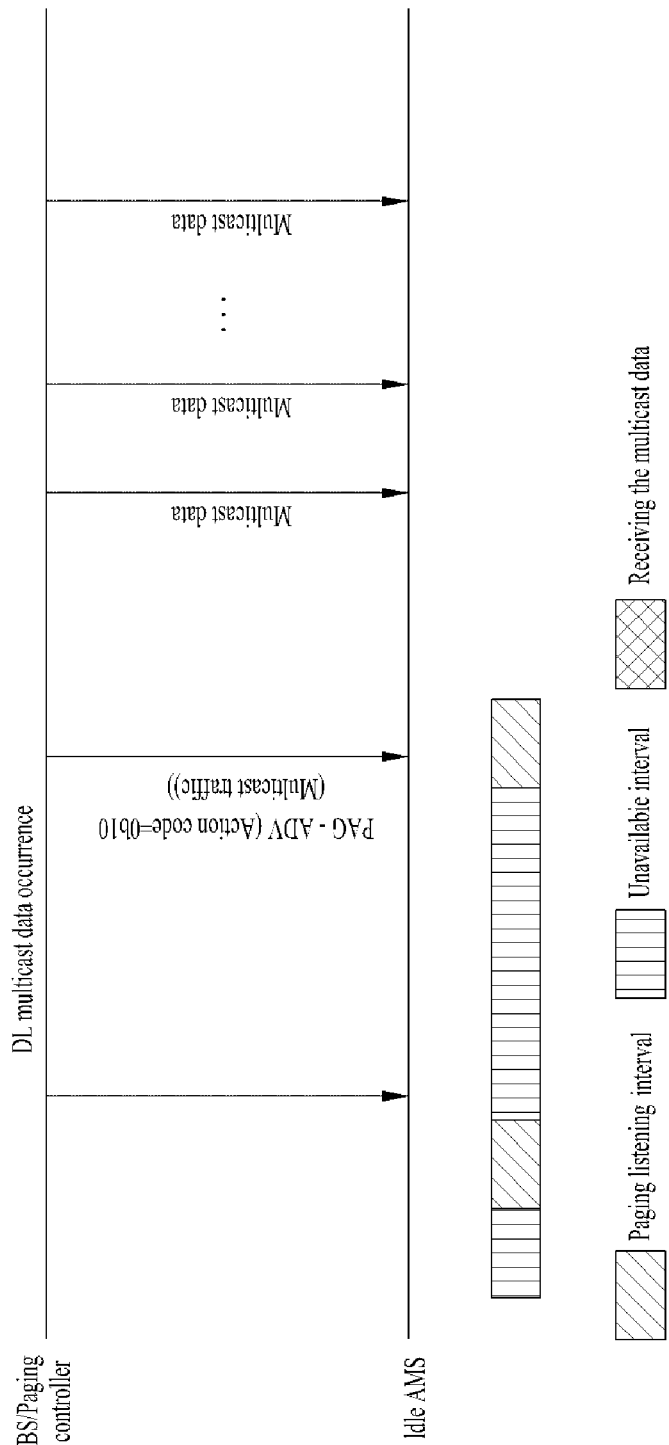
FIG. 3 is a diagram illustrating a procedure of transmitting multicast traffic between an M2M device and a base station.

FIG. 3 is a diagram illustrating an example of multicast data transmission between the user equipment and the base station according to one embodiment of the present invention.

If the base station receives downlink multicast data from the network, it notifies the user equipments, which are in the idle mode, that there are downlink multicast data, through a paging message before transmitting the downlink multicast data to the user equipments within a cell. To this end, the paging message may include a multicast traffic indicator (e.g., action code=0b10, related ID (M2M group ID)). When the user equipment of the idle mode receives the paging message, it identifies whether there is a multicast traffic indicator. If there is a multicast traffic indicator, the user equipment identifies whether the multicast traffic indicator includes M2M group ID of a group (or ID related with multicast data allocated to the user equipment) belong thereto. If there is ID belonging to the user equipment, the user equipment receives downlink multicast data while maintaining the idle mode (i.e., without performing network reentry).

Figure 4:
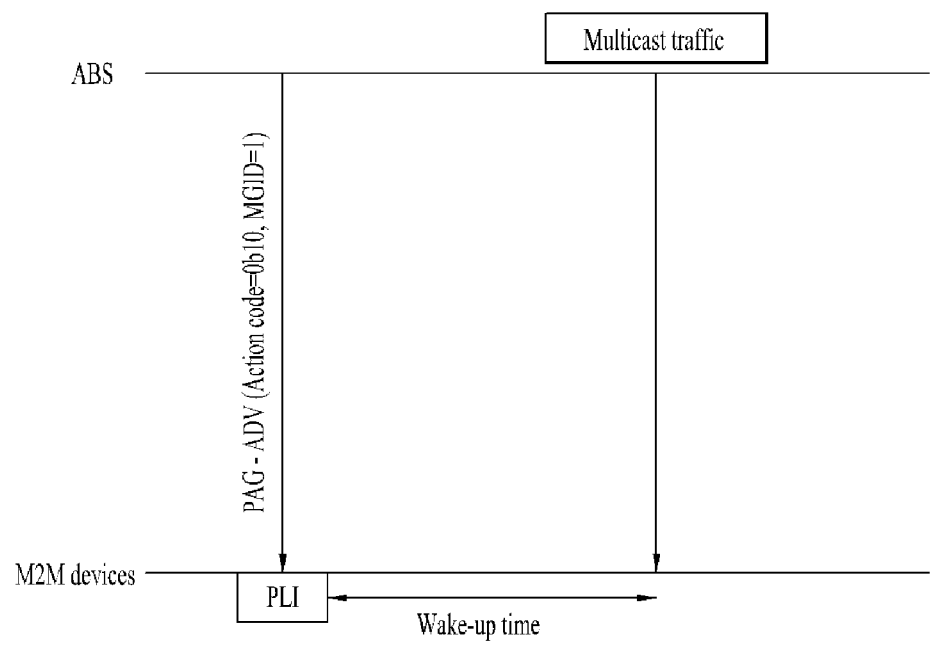
FIG. 4 is a diagram illustrating a procedure of transmitting multicast traffic between M2M devices having the same paging offset value and a base station.

FIG. 4 is a diagram illustrating a procedure of transmitting multicast traffic between M2M devices having the same paging offset value and a base station.

In FIG. 4, the user equipment in the idle mode receives a multicast traffic indicator of which action code is 0b10 from the base station for a listening interval or available interval (AI) and receives group information (M2M group ID) for multicast traffic. If the group of the group information is the group to which the user equipment belongs, the user equipment waits for receiving multicast traffic without network reentry.

In the above scenario, if the base station does not have downlink resource for transmitting multicast data and thus transmits the multicast data to the user equipment after a long time since paging, the user equipments should continue to receive and decode data (e.g., downlink control channel information such as A-MAP or MAP, broadcast control MAC messages such as SCD, SII-ADV, ULPC-NI) transmitted to a downlink channel until the multicast data are transmitted. This may increase unnecessary power consumption of the user equipment.

Figure 5:
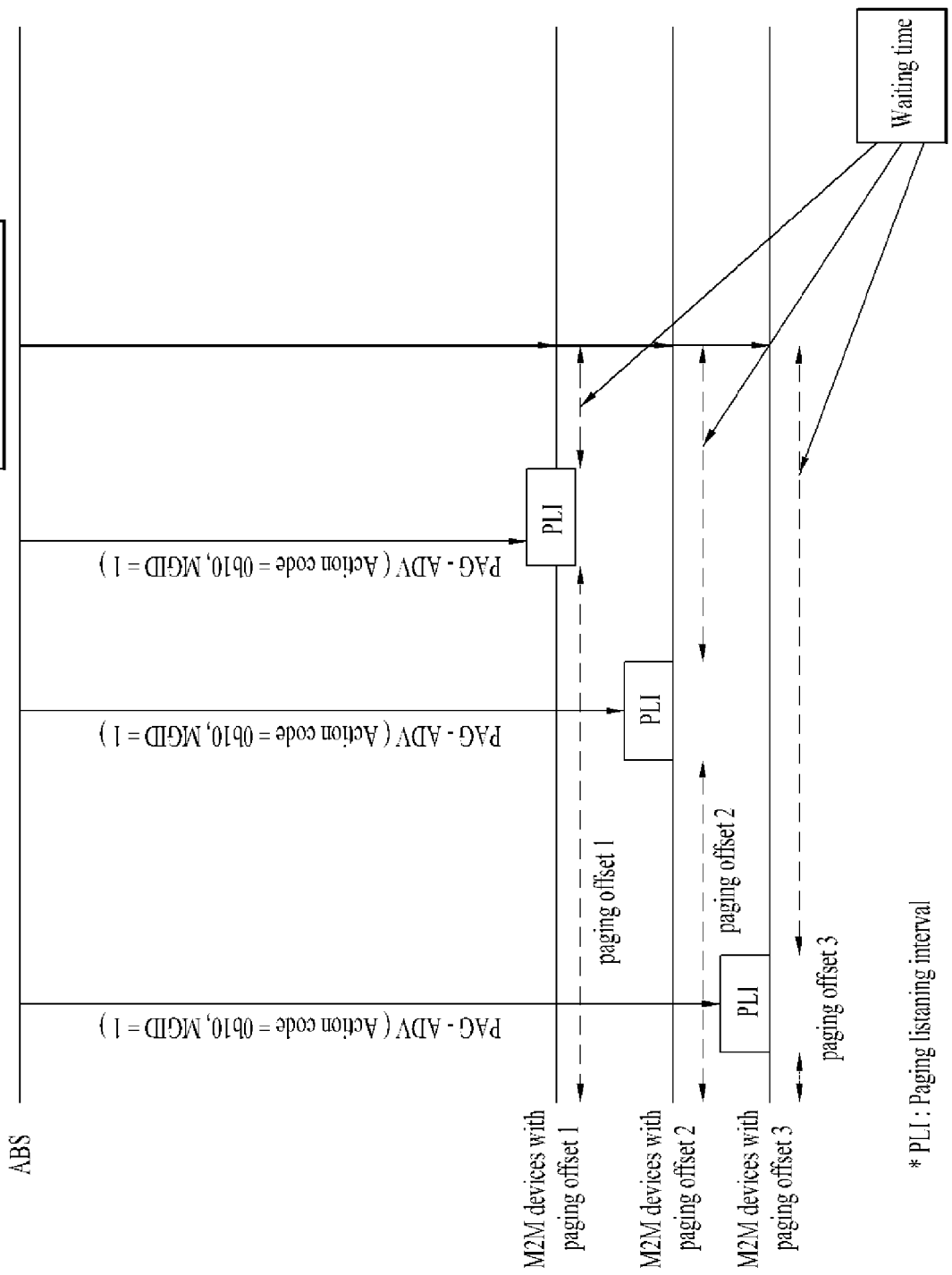
FIG. 5 is a diagram illustrating a procedure of transmitting multicast traffic between M2M devices having different paging offset values and a base station.

FIG. 5 is a diagram illustrating a procedure of transmitting multicast traffic between M2M devices having different paging offset values and a base station.

If user equipments, which belong to one M2M group, are allocated with different paging offset values or belong to other paging group, the user equipments allocated with the same MGID may actually receive multicast paging at different times. For this reason, among the user equipments which belong to the same M2M group, specific user equipments may wait for a longer time than the time when the other user equipments are waiting, so as to receive multicast data. FIG. 5 illustrates an example of this waiting time. The user equipments having one paging offset 1, 2, 3 are allocated with the same MGID=1, and the user equipments having the paging offset 3 in this scenario have more longer waiting time than that of the user equipments having the paging offset 1. In this case, a problem occurs in that unnecessary power consumption of the user equipments having the paging offset 3 may be increased.

In order to solve the problem, the present invention suggests the following embodiment. The base station transmits the paging message (AAI-PAG-ADV message in the IEEE 802.16m and MOB_PAG-ADV message in the IEEE 802.16e, the present invention will be described based on the IEEE 802.16m AAI-PAG-ADV), which includes multicast transmission start time (MTST), to the user equipment. When the user equipment in the idle mode receives the paging message, it receives downlink multicast data in accordance with the MTST while maintaining the idle mode (that is, without performing network reentry).

Figure 6:
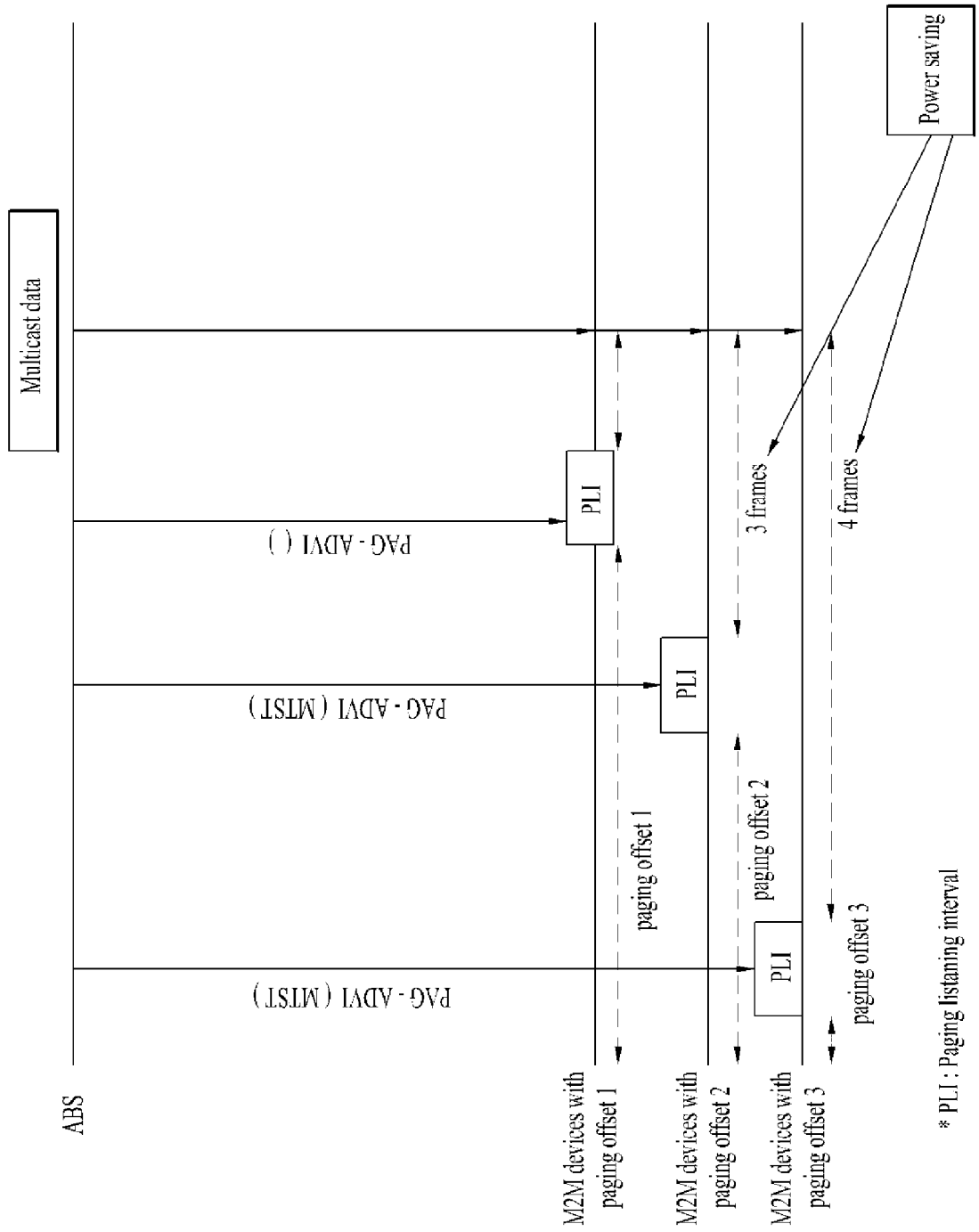
FIG. 6 is a diagram illustrating multicast data transmission between a user equipment and a base station according to one embodiment of the present invention.

FIG. 6 is a diagram illustrating multicast data transmission and reception between M2M device and a base station according to one embodiment of the present invention.

If there are multicast data for predetermined M2M devices, the base station of the present invention transmits the paging message, which includes MTST, to the M2M devices. If there are multicast data for a specific M2M group, the base station of the present invention may transmit MTST together with the paging message, which pages the specific M2M group, or may transmit the paging message, which includes MTST. Alternatively, the base station may transmit MTST only if multicast data cannot be transmitted immediately after the paging message is transmitted. The M2M device identifies whether the multicast transmission start time (MTST) is included in the paging message (AAI-PAG-ADV) when receiving the paging message for its paging listening interval. If the multicast transmission start time (MTST) is included in the paging message, the M2M device may perform power down action until superframe/frame/subframe indicated by the MTST to reduce power consumption. In other words, the M2M device may receive multicast data from superframe/frame/subframe indicated by the MTST. In this case, the MTST may be a super frame number/frame number/subframe number where the base station starts downlink multicast data transmission. Alternatively, the MTST is the waiting time for transmission start of downlink multicast data on the basis of the time when the M2M device receives the paging message, and may mean frame offset. Also, a unit representing the MTST may be a frame unit, a subframe unit or a superframe unit (20 ms). As shown in FIG. 6, the paging message (PAG-ADV) may include the MTST. The M2M devices may include their respective paging offset values. As shown in FIG. 6, the paging offsets 1, 2 and 3 may have their respective values different from one another. The M2M devices having paging offsets 2 and 3 cannot transmit multicast data directly after transmitting the paging message. Accordingly, the M2M devices having the paging offsets 2 and 3 may perform power down action until superframe/ frame/subframe indicated by the MTST included in the corresponding paging message to reduce power consumption. In other words, the M2M devices having the paging offset 2 and the M2M devices having the paging offset 3 may perform power down action for superframe/frame/subframe indicated by the MTST.

For reference, the frame number indicated by the MTST may be calculated based on the superframe number in the IEEE 802.16m system. In other words, the frame number is defined by "(superframe number−1)*4". On the other hand, in the IEEE 802.16e system, the frame number exists in the MAP and is transmitted per frame.

Through the aforementioned action, when the base station transmits multicast data generated by the fixed M2M device in an even triggered mode, the idle mode M2M device may efficiently provide multicast data by using the paging method without ending the idle mode.

In the aforementioned embodiment of the present invention, the paging message may be transmitted as follows.

The following Table 1 illustrates AAI-PAG-ADV format in which a multicast traffic indicator and MGID are included in the paging message.

TABLE 1

| Fields | Size | Value | Condition |
|---|---|---|---|
| ... | ... | ... | ... |
| For (i=0; i<Num_MGID; i++) { | | Num_MGID indicates the number of MGIDs included in this paging message [0 ... 63] | |
| MGID | 12 | M2M Group ID | |
| Action Code | 2 | 0b00: Performing network reentry0b01: Performing location update0b10: Receiving multicast traffic0b11: reserved | |
| ... | ... | ... | |
| } | | | |
| ... | ... | ... | ... |

Referring to Table 1, the base station may transfer MGID to the M2M device. The MGID field means M2M group ID, and may be represented by 12 bits. Also, Num_MGID represents the number of MGIDs included in the paging message. The base station may transfer the paging message, which includes an action code field, to the M2M device. The action code field indicates a purpose of use of the paging message. For example, if the purpose of the paging message indicates paging for network reentry, the action code field may be indicated by '0b00'. If the purpose of the paging message indicates paging for location update, the action code field may be indicated by '0b01'. If the purpose of the paging message indicates reception for multicast traffic, the action code field may be indicated by '0b10'. If action indicates a reserved state, it may be indicated by '0b11'.

However, if user equipments, which belong to one M2M group, are allocated with different paging offset values or belong to other paging group, the user equipments allocated with the same MGID may actually receive multicast paging at different times. For this reason, among the user equipments which belong to the same M2M group, specific user equipments may wait for a longer time than the time when the other user equipments are waiting, so as to receive multicast data.

In order to solve the above problem, the base station of the present invention transmits the paging message, which includes information on the time when the base station starts to transmit the multicast data, to the user equipment, when transmitting the paging message including the multicast traffic indicator. The user equipment may receive the paging message and perform power down to reduce power consumption until the multicast data transmission start time included in the paging message. This will be illustrated in FIG. 7 and FIG. 8.

The embodiment described in FIG. 4 and FIG. 5 may be used together with the embodiment of FIG. 6. In the words, the paging message, as shown in FIG. 6, may include MTST, and the paging message, which includes MTST, may additionally include MGID and action code as shown in FIG. 4 and FIG. 5.

Figure 7:
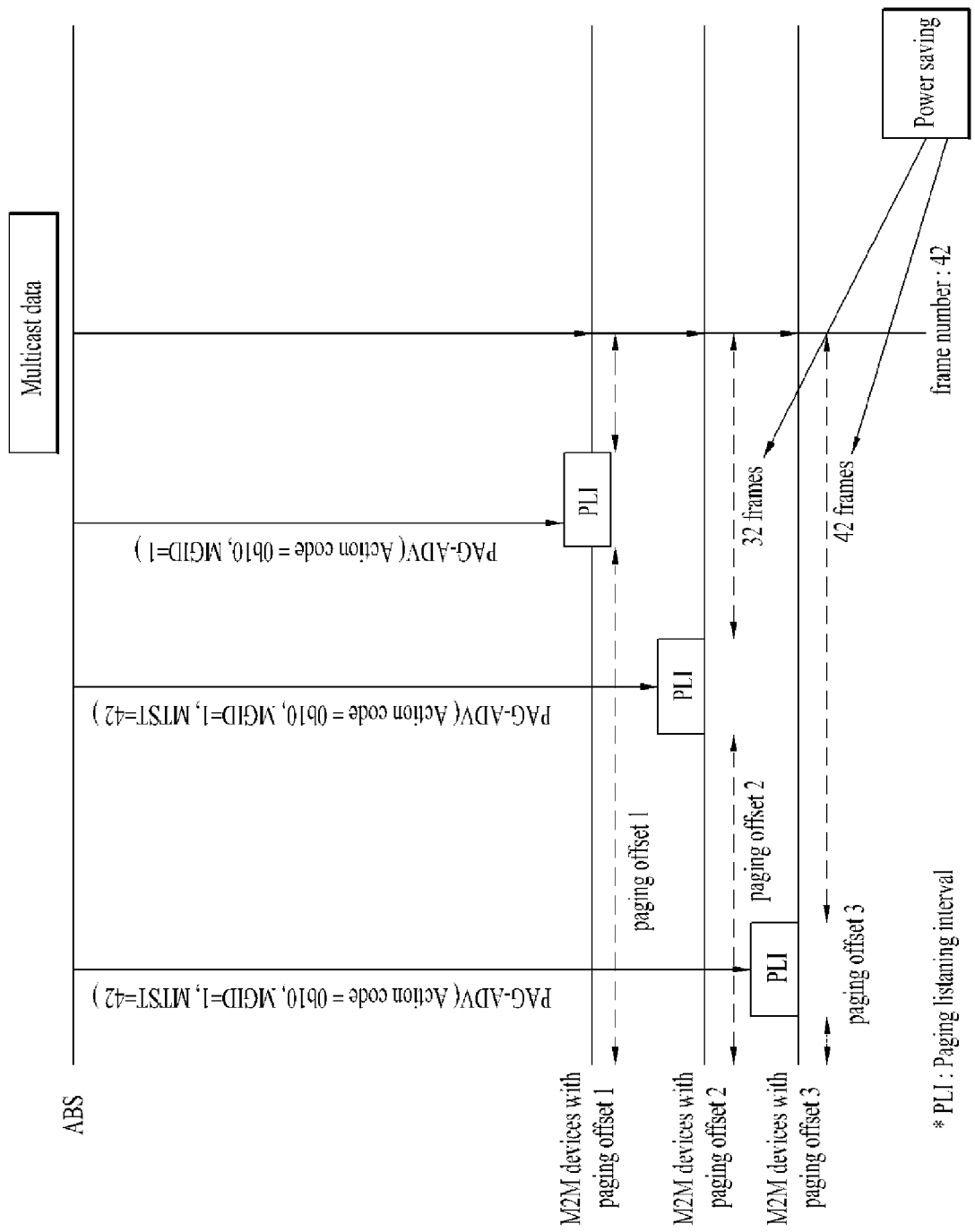
FIG. 7 is a diagram illustrating a procedure of transmitting multicast traffic between an M2M device and a base station according to another embodiment of the present invention.

FIG. 7 is a diagram illustrating a procedure of transmitting multicast traffic between an M2M device and a base station according to another embodiment of the present invention. In particular, FIG. 7 illustrates that MTST indicating absolute time when the base station starts to transmit multicast data is transmitted from the base station to the M2M device.

The base station which intends to transmit multicast data to predetermined M2M devices transmit the paging message, which includes MGID of M2M group to which the predetermined M2M devices belong and MTST indicating the time when the multicast data will be transmitted. The M2M device receives the paging message (AAI-PAG-ADV) for its listening interval. The M2M device identifies whether the paging message is for the M2M device, through the MGID allocated to the M2M device. If the target of the paging message is the M2M device and action code of the paging message is set to a multicast traffic indicator of 0b10, the M2M device identifies multicast transmission start time (MTST) included in the paging message. If the MTST is included in the paging message, the M2M device may perform power down action until a frame indicated by the MTST to reduce power consumption. In other words, the M2M device will receive the multicast data from the frame indicated by the MTST.

Referring to FIG. 7, the base station may transmit the paging message, which includes a multicast traffic indicator and MTST, to the user equipments having paging offset 2 and paging offset 3. At this time, it is assumed that each MTST indicates a frame having a frame number of 42. After receiving the paging offset 2 and the paging offset 3, the user equipments having paging offset 2 and paging offset 3 may receive the multicast data when the frame number is 42, and may perform action for reducing power consumption until the corresponding frame.

The following Table 2 illustrates AAI-PAG-ADV format which is an example of a paging message that includes multicast transmission start time (MTST).

TABLE 2

| Fields | Size | Value | Condition |
|---|---|---|---|
| ... | ... | ... | ... |
| For (i=0; i<Num_MGID; i++) { | | Num_MGID indicates the number of MGIDs included in this paging message [0 ... 63] | |
| MGID | 12 | M2M Group ID | |
| Action Code | 2 | 0b00: Performing network reentry0b01: Performing location update0b10: Receiving multicast traffic0b11: reserved | |

TABLE 2-continued

| Fields | Size | Value | Condition |
|---|---|---|---|
| If (Action code == 0b10) { Multicast transmission start time (MTST) | 8 | Least Significant 8 bits of the frame number in which the ABS starts sending DL multicast data. | Shall be present when the MTST needs to be included in this message |
| } ... } ... | | ... ... ... ... | ... |

In Table 2, since the MGID field and the action code field are the same as those of Table 1, their detailed description will be omitted.

The base station may transmit information indicating absolute time for corresponding multicast data transmission to the M2M devices as MTST. Referring to Table 2, the base station may transmit a frame number starting transmission of the corresponding multicast data to the M2M devices as MTST, wherein the M2M devices are targets of the multicast data. The user equipment which is the target for transmission of the multicast data may reduce power consumption by performing power down action until the frame indicated by the MTST. In other words, the user equipment may start to receive multicast data from the frame indicated by the MTST.

Figure 8:
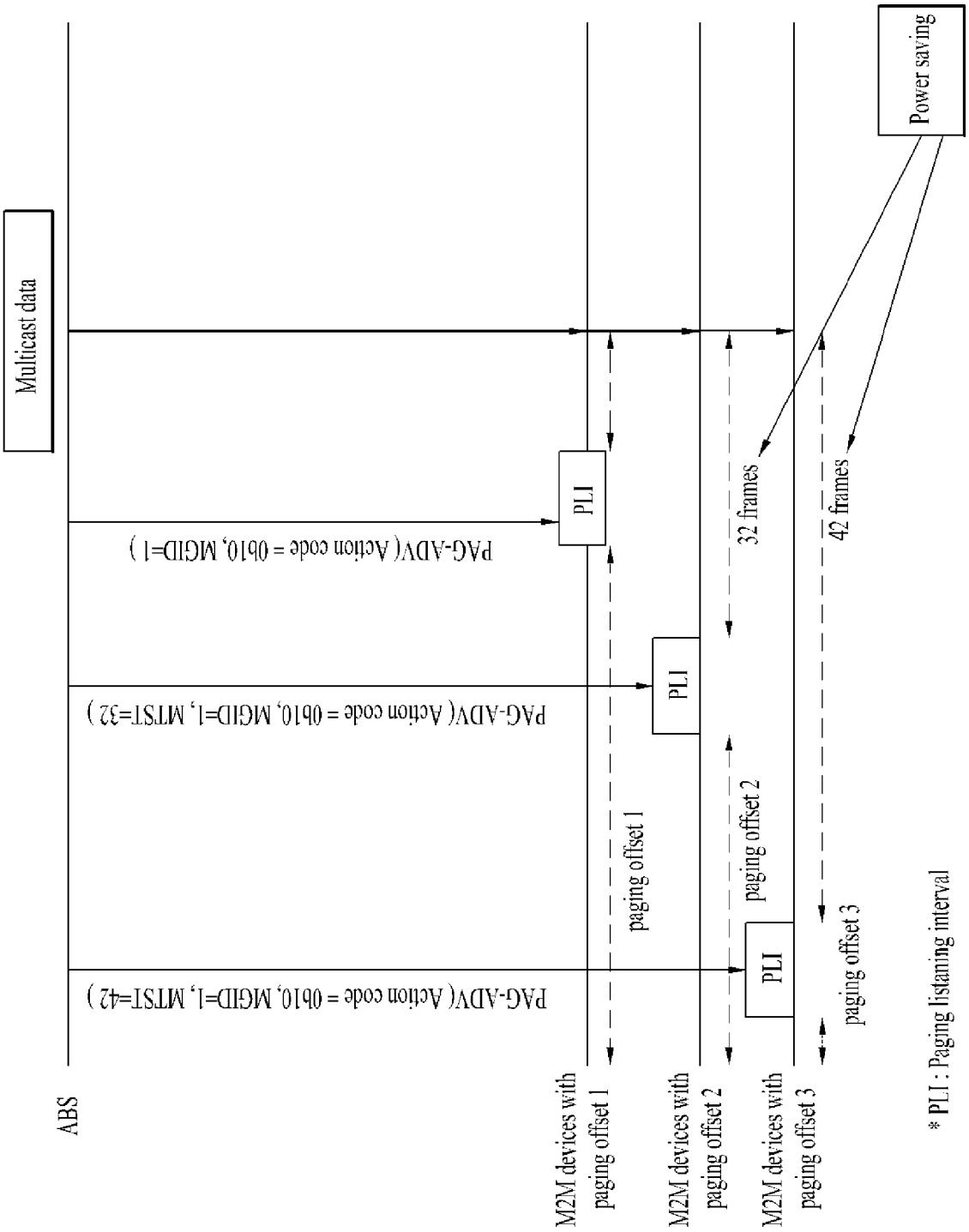
FIG. 8 is a diagram illustrating a procedure of transmitting multicast traffic between an M2M device and a base station according to other embodiment of the present invention.

FIG. 8 is a diagram illustrating a procedure of transmitting multicast traffic between an M2M device and a base station according to other embodiment of the present invention. In particular, FIG. 8 illustrates that MTST indicating relative time when the base station starts to transmit multicast data is transmitted from the base station to the M2M device. In the embodiment of FIG. 7, information indicating superframe, frame, or subframe, where multicast data should be received in the corresponding M2M device is transmitted to the M2M device in a type of an absolute value (for example, superframe number, frame number, or subframe number), whereas the M2M device transmits an offset value indicating the waiting time until the multicast data are received in the embodiment of FIG. 8.

Referring to FIG. 8, the base station may transmit the paging message, which includes MTST, to the user equipments having paging offset 2 and paging offset 3. According to this embodiment, the MTST corresponds to an offset value indicating a waiting time when the M2M devices receive the multicast data. For example, referring to FIG. 8, MTST values for the user equipments of paging offset 2 and the user equipments of paging offset 3 are frame 32 and frame 42, respectively. After receiving the paging message, the user equipments of paging offset 2 may receive the multicast data after the frame 32, and may perform action for reducing power consumption until the corresponding frame. After receiving the paging message, the user equipments of paging offset 3 may receive multicast data after frame 42, and may perform action for reducing power consumption until the corresponding frame.

The following Table 3 illustrates AAI-PAG-ADV format which is another example of a paging message that includes multicast transmission start time (MTST).

TABLE 3

| Fields | Size | Value | Condition |
|---|---|---|---|
| ... | ... | ... | ... |
| For (i=0; i<Num_MGID; i++) { | | Num_MGID indicates the number of MGIDs included in this paging message [0 ... 63] | |
| MGID | 12 | M2M Group ID | |
| Action Code | 2 | 0b00: Performing network reentry 0b01: Performing location update 0b10: Receiving multicast traffic 0b11: reserved | |
| If (Action code == 0b10) { Multicast transmission start time (MTST) | 8 | The frame offset in which the ABS starts sending DL multicast data. 00000000: current frame 00000001: transmission after 1 frame 00000010: transmission after 2 frames ... 11111111: transmission after 255 frames | Shall be present when the MTST needs to be included in this message |
| } ... } ... | | ... ... | ... |

The MTST is indicated by a frame number in Table 2, whereas the MTST is indicated by a frame offset in Table 3.

Referring to Table 3, the MTST is a waiting time for downlink multicast data transmission start on the basis of the time when the M2M device has received the paging message, and may mean frame offset. In other words, the MTST is a frame offset value indicating a waiting time when the M2M device receives the multicast data.

Operation of the user equipment that performs the MTST in the IEEE 802.16e based M2M system is the same as that in the IEEE 802.16m based M2M system. In other words, in the IEEE 802.16e based M2M system, if M2M devices receive MOB_PAG-ADV, which includes the MTST, they may reduce power consumption until the MTST.

Also, although the unit indicating the MTST is described in a unit of frame, the frame unit may be changed to a subframe unit or a superframe unit (20 ms).

The following Table 4 illustrates another example of a paging message which includes multicast transmission start time (MTST).

In the following Table 4, each M2M group paging parameter (TLV) may be included in the MOB_PAG-ADV message. The MTST of the following Table 4 may be in the TLV which is an M2M group paging parameter.

TABLE 4

| Name | Type | Length | Value |
|---|---|---|---|
| Multicast transmission start time (MTST) | x.2 | 1 | Least significant 8 bits of the frame number in which the ABS starts sending DL multicast data |

In Table 4, the MTST may be included in the MOB_PAG-ADV message and may be transmitted from the base station to the M2M devices. Also, the MTST may be included in the MOB_PAG-ADV message and may be transmitted with an action code. If the action code which is the multicast traffic indicator indicates 0b10, the M2M device may receive multicast traffic without performing network reentry. If the action code which is the multicast traffic indicator indicates 0b10 and MTST is included in the MOB_PAG-ADV message, the M2M device may receive multicast traffic from the frame indicated by the MTST. In Table 4, in the IEEE 802.16e based M2M system, although the unit indicating the MTST is described in a unit of frame, the frame unit may be changed to a subframe unit or a superframe unit (20 ms).

Referring to FIG. 1, a processor (hereinafter, base station processor) of the base station according to the present invention may generate the paging message, which pages the M2M devices, to transmit multicast data based on one or more M2M devices (mainly, a plurality of M2M devices). The base station processor may generate the paging message to include information (for example, MGID) identifying M2M group to which the M2M devices belong, and/or information (for example, action code set to 0b10) indicating the presence of the multicast data. Also, the base station processor may generate the paging message to include time information indicating the time when the base station starts to transmit the multicast data. The base station processor may control a transmitter (hereinafter, base station transmitter) of the base station to transmit the paging message to the M2M devices. The base station processor starts transmission of the multicast data at the time indicated by the time information by controlling the base station transmitter.

A processor (hereinafter, M2M processor) of the M2M device according to the present invention receives the paging message from the base station for the listening interval of the M2M device by controlling a receiver (hereinafter, M2M receiver) of the M2M device. The M2M processor may identify whether the paging message is the message associated with the M2M device, by using M2M device group information included in the paging message. Also, the M2M processor may recognize the presence of multicast data to be received by the M2M device, by using the paging message, for example, action code within the paging message. The M2M processor may identify when the M2M device should receive the multicast data from the base station, by using the time information included in the paging message. The M2M processor may perform power down of the M2M device until the multicast data should be received, by using the time information. The M2M processor may receive the multicast data from the base station by increasing the received power of the M2M receiver from the time indicated or inferred by the time information. The M2M receiver may receive the multicast data from the base station at the time indicated by the time information under the control of the M2M processor.

According to the embodiments of the present invention, if there is ID belonging to the user equipment, the user equipment may efficiently mange the M2M system without ending the idle mode by receiving downlink multicast data while maintaining the idle mode (i.e., without performing network reentry).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to the wireless communication system.

The invention claimed is:

1. A method for performing a multicast operation by a machine to machine (M2M) device in an idle mode, the method comprising:
   receiving a paging message including multicast traffic indication in a paging listening interval from a base station; and
   receiving multicast data in the idle mode from the base station,
   wherein, when the paging message further includes time information indicating a frame in which the multicast data is transmitted by the base station, the receiving of the multicast data is started at the frame indicated by the time information and the M2M device is powered down until the frame, and
   wherein, when the paging message does not include the time information, the receiving of the multicast data is started in the paging listening interval.

2. The method according to claim 1, wherein the time information corresponds to a frame number in which the base station starts transmission of the multicast data.

3. The method according to claim 1,
   wherein the paging message further includes an M2M device group identifier indicating M2M group which is a transmission target of the multicast data, and
   wherein, when the M2M device group identifier indicates a M2M device group to which the M2M device belongs, the receiving of the multicast data is performed.

4. A method for performing a multicast operation by a base station, the method comprising:
   transmitting a paging message including multicast traffic indication to a machine to machine (M2M) device in an idle mode in a paging listening interval; and
   transmitting multicast data to the M2M device in the idle mode,
   wherein, when the transmission of the multicast data is started in a time other than the paging listening interval, the paging message further includes time information indicating a frame in which the multicast data is transmitted, the transmission of the multicast data being started at the frame and the M2M device being powered down until the frame, and
   wherein, when the transmission of the multicast data is started in the paging listening interval, the paging message does not include the time information.

5. The method according to claim 4, wherein the time information corresponds to a frame number in which the base station starts transmission of the multicast data.

6. The method according to claim 4, wherein the paging message further includes an M2M device group identifier indicating a M2M device group to which the M2M device belongs.

7. A machine to machine (M2M) device configured to perform a multicast operation in an idle mode, the M2M device comprising:
- a receiver; and
- a processor configured to control the receiver,
- wherein the processor controls the receiver to receive a paging message including multicast traffic indication in a paging listening interval from a base station and controls the receiver to receive multicast data in the idle mode from the base station,
- wherein, when the paging message further includes time information indicating a frame in which the multicast data is transmitted by the base station, the receiving of the multicast data is started at the frame indicated by the time information and the M2M device is powered down until the frame, and
- wherein, when the paging message does not include time information, the receiving of the multicast data is started in the paging listening interval.

8. The M2M device according to claim 7, wherein the time information corresponds to a frame number in which the base station starts transmission of the multicast data.

9. The M2M device according to claim 7,
- wherein the paging message further includes an M2M device group identifier indicating M2M group which is a transmission target of the multicast data, and
- wherein, when the M2M device group identifier indicates a M2M device group to which the M2M device belongs, the receiving of the multicast data is performed.

10. A base station configured to perform a multicast operation, the base station comprising:
- a transmitter; and
- a processor configured to control the transmitter,
- wherein the processor controls the transmitter to transmit a paging message including multicast traffic indication a machine to machine (M2M) device in an idle mode in a paging listening interval and controls the transmitter to transmit multicast data to the M2M device in the idle mode,
- wherein, when the transmission of the multicast data is started in a time other than the paging listening interval, the paging message further includes time information indicating a frame in which the multicast data is transmitted, the transmission of the multicast data being started at the frame and the M2M device being powered down until the frame, and
- wherein, when the transmission of the multicast data is started in the paging listening interval, the paging message does not include the time information.

11. The base station according to claim 10, wherein the time information corresponds to a frame number in which the base station starts transmission of the multicast data.

12. The base station according to claim 10, wherein the paging message further includes an M2M device group identifier indicating a M2M device group to which the M2M device belongs.

* * * * *